United States Patent [19]

Tanaka

[11] Patent Number: 4,617,601
[45] Date of Patent: Oct. 14, 1986

[54] MAGNETO-OPTICAL RECORDING MEDIUM HAVING RECORDING GUIDE TRACKS

[75] Inventor: Motoharu Tanaka, Numazu, Japan

[73] Assignee: Ricoh Company, Ltd., Tokyo, Japan

[21] Appl. No.: 491,141

[22] Filed: May 3, 1983

[30] Foreign Application Priority Data

Jun. 18, 1982 [JP] Japan .................................. 57-103937

[51] Int. Cl.$^4$ ............................ G11B 7/26; G11B 5/82
[52] U.S. Cl. ..................................... 360/131; 369/275
[58] Field of Search ........................ 360/131, 114, 59; 365/110–112, 121–122; 369/13, 111, 275, 277, 279; 346/137, 135.1

[56] References Cited

U.S. PATENT DOCUMENTS

| | | | |
|---|---|---|---|
| 3,174,140 | 3/1965 | Hagopian et al. | 360/114 |
| 3,655,441 | 4/1972 | Kefalas | 360/131 |
| 4,414,650 | 11/1983 | Ohta et al. | 365/122 |
| 4,417,290 | 11/1983 | Tanaka et al. | 360/131 |
| 4,467,383 | 8/1984 | Ohta et al. | 360/131 |

OTHER PUBLICATIONS

H. Wieder, "Multilayer Magneto–Optic Structure," IBM TDC, Nov. 1972, vol. 15, No. 6, p. 1762.

Primary Examiner—John H. Wolff
Assistant Examiner—David J. Severin
Attorney, Agent, or Firm—Flynn, Thiel, Boutell & Tanis

[57] ABSTRACT

A magneto-optical recording medium having a magnetic film layer on one flat surface of the recording medium, which magnetic film layer is magnetizable in the direction normal to the surface of the medium; and guide tracks on the other side opposite to the magnetic film layer.

13 Claims, 2 Drawing Figures

MAGNETO-OPTICAL RECORDING MEDIUM HAVING RECORDING GUIDE TRACKS

BACKGROUND OF THE INVENTION

The present invention relates to a magneto-optical recording medium having guide tracks, and more particularly to a magneto-optical recording medium having a vertically anisotropic magnetic film layer on one flat surface thereof and guide tracks on the other side opposite to the magnetic film layer.

Generally, a magneto-optical information storage apparatus capable of performing high-density recording has recording tracks with a width of about 1 μm. In such a magneto-optical information storage apparatus, information recording and reproduction are performed by use of an extremely sharp thin laser beam. Therefore, it is necessary to cause the laser beam to follow accurately the necessary track for recording or reproduction, without coming into a wrong track. In order to accomplish this, an extremely accurate optical system or servo-mechanism having guide tracks is necessary.

Conventionally, the following guide track systems are known for use with a magneto-optical recording and reproduction apparatus:

(1) Guide track system in which a magnetic-film-coated recording and reproduction medium having grooved guide tracks is employed.

(2) Guide track system in which a magnetic-film-coated and reproduction medium having vertically (i.e., normal to the surface of the medium) anisotropic magnetic portions and horizontally (i.e., along the surface of the medium) magnetic portions is employed, and guide tracking is performed along the horizontally anisotropic magnetic portions.

(3) Guide track system in which a magnetic-film-coated medium having an amorphous portion and a crystalline portion is employed, and guide tracking is performed along the crystalline portion.

The first guide track system has the shortcoming that, since it is necessary to coat a magnetic film on a non-uniform surface of a medium base, it is difficult to form a magnetic film with a uniform thickness, and, accordingly, it is difficult to obtain constant magnetic characteristics necessary for the guide tracking. The only advantage of the guide track system is that the recording medium can be mass-produced.

In the case of the second guide track system, a vertically anisotropic magnetic film is coated on a flat medium base, and horizontal anisotropic guide tracks are then formed in the magnetic film by heat application using sharp laser beams. The shortcoming of this guide track system is that the mass-production of the recording medium is difficult.

In the case of the third guide track system, a vertically anisotropic amorphous magnetic film is formed on a flat medium base, and crystalline guide tracks are formed in the amorphous magnetic film by heat application using sharp laser beams. The shortcoming of this guide track system is that mass-production of the recording medium is difficult.

SUMMARY OF THE INVENTION

It is therefore an object of the present invention to provide a magneto-optical recording medium with guide tracks, which guide tracks do not have any adverse effects on the recording performance of the recording medium and which recording medium can be mass-produced without difficulty.

According to the present invention, this object is attained by a magneto-optical recording medium having vertically (i.e. normal to the surface of the medium) anisotropic magnetic film layer on one flat surface thereof and guide tracks on the other side opposite to the magnetic film layer.

DETAILED DESCRIPTION OF THE PREFERRED EMBODIMENTS

Figure 1:
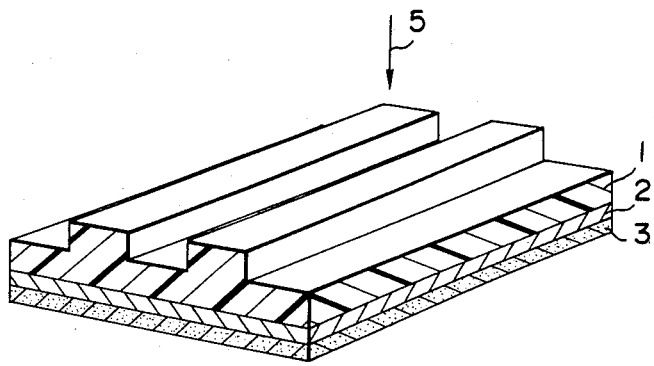
FIG. 1 is a schematic partial cross-sectional perspective view of an embodiment of a magneto-optical recording medium according to the present invention.

Referring to FIG. 1, the structure of an embodiment of a magneto-optical recording medium according to the present invention will now be explained.

In the figure, reference numeral 1 represents a recording medium base having grooved guide tracks on one side thereof, a vertically anisotropic magnetic film layer 2 formed on a flat side of the recording medium base 1 opposite to the grooved tracks, and a protective layer 3 formed on the magnetic film layer 2. The magnetic film layer 2 is magnetizable anisotropically in the direction normal to the flat surface of the recording medium base 1. In the present invention, it is preferable to form the protective layer 3 on the magnetic film layer 2, but it is not necessarily an indispensable member.

As the recording medium base 1, any materials which are transparent to light, such as transparent plastic materials and transparent ceramics, can be employed.

Since the amplification of the Kerr rotation angle of the recording medium at the time of reproduction depends upon the thickness of the recording medium base, it is preferable that the recording track portion and the guide track portion in the recording medium base be different in thickness in such a manner that the reflectance of the recording track portion is smaller than the reflectance of the guide track portion. Further, it is preferable that the width of each guide track be in the range of about 0.5 μm to about 3 μm, and the pitch of the guide tracks be in the range of about 1.5 μm to about 6 μm.

The magnetic film layer 2 can be made of a "rare-earth-element—transition-element" combination type amorphous film comprising, for instance, Gd-Fe, Tb-Fe, Dy-Fe, Gd-Tb-Fe, Gd-Dy-Fe or Gd-Co; or a polycrystalline film comprising, for instance, Mn-Bi, Mn-Cu-Bi or Pt-Co. It is preferable that the magnetic film 2 be magnetically anisotropic vertically (i.e. normal to the surface of the magnetic film 2) and have high magnetic coercivity around room temperature and its Curie point be in the range of 70° .C to 200° C.

The magnetic film layer 2 can be formed by sputtering vacuum evaporation or ion-plating. It is preferable that the thickness of the magnetic film layer 2 be in the range of about 0.05 μm to about 0.5 μm.

The protective layer 3, made of a non-magnetic material, such as SiO or $SiO_2$, is overlayed on the magnetic film 2 by sputtering or vacuum evaporation, in order to protect the magnetic film 2 from being oxidized, abraded or scratched. It is preferable that the thickness of the protective layer 3 be in the range of about 0.1 μm to about 0.5 μm.

Figure 2:
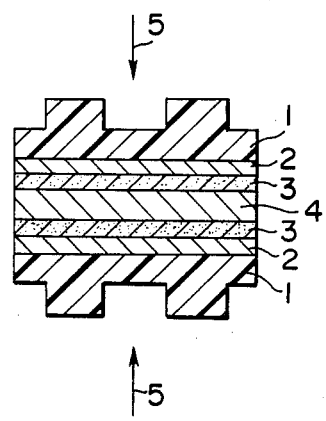
FIG. 2 is a schematic cross-sectional view of another embodiment of a magneto-optical recording medium according to the present invention.

Referring to FIG. 2, there is shown a schematic cross sectional view of another embodiment of a magneto-optical recording medium according to the present invention. As can be seen from the figure, this embodiment is constructed in such a manner that an intermediate base material 4 is sandwiched between two of the magneto-optical information recording mediums shown in FIG. 1. In this embodiment, tracking is performed by projecting a laser beam 5 to the upper portion of the grooved side of the recording medium. Upon the laser beam 5 being projected to the grooved side of the recording medium, it reaches the magnetic film layer 2, since the recording medium base 1 is transparent to the laser beam 5. Since the magnetic film layer 2 has a mirror surface at least on the side in contact with the recording medium base 1, the laser beam 5 is reflected by the mirror surface. The recording medium base 1 has the concave groove portions, and the convex portions beside the grooves, the laser beam, reflected by the mirror surface and emerging from the concave groove portions, and the laser beam, reflected by the mirror surface and emerging from the convex portions, are different in the reflection ratio from each other. Tracking is performed by detecting the difference in reflection ratio. On the other hand, recording is performed by projecting a modified laser beam to the convex portions of the recording medium base as shown in FIG. 1 so as to heat the magnetic film layer 2 to its Curie temperature, thereby decreasing its magnetic coercivity, and then by applying an external magnetic field to the magnetic film 2, so that the magnetization of the magnetic film layer 2 is reversed.

In the case of the magneto-optical recording medium according to the present invention, since the recording tracks and the magnetic film layer are formed on the opposite sides of the recording medium base, there are substantially no difficulties in mass-producing the magneto-optical recording medium.

What is claimed is:

1. A magneto-optical recording medium, comprising:
   a monolithic, light-transparent, planar, non-metallic, recording medium base having a flat surface on one side thereof and having a dentate surface on the opposite side thereof, said dentate surface defining a grooved guide track and teeth between adjacent groove portions of said grooved guide track, the entirety of said recording medium base, including said teeth, being made of a single light-transparent non-magnetic material;
   a vertically anisotropic magnetic film layer coated directly on said flat surface and being disposed on the opposite side of said base from said dentate surface, said magnetic film layer being magnetizable anisotropically in a direction normal to said flat surface of said base, said magnetic film layer having a mirror surface in contact with said flat surface of said base and being effective to reflect a laser beam that is directed through said base from said opposite side thereof and against said mirror surface,
   the thickness of said base being less at said grooved guide track than at said teeth so that the reflectance of said base is different at said grooved guide track and at said teeth, respectively whereby tracking is performed by detecting said difference in reflectance.

2. A magneto-optical recording medium as claimed in claim 1 in which said recording medium base is made of light-transparent plastic.

3. A magneto-optical recording medium as claimed in claim 1 in which said recording medium base is made of light-transparent ceramic.

4. A magneto-optical recording medium as claimed in claim 1 including a protective layer made of SiO or $SiO_2$ coated directly on said metallic film layer on the opposite side thereof from said recording medium base.

5. A magneto-optical recording medium, comprising:
   a first, monolithic, light-transparent, planar, non-metallic, recording medium base having a flat surface on one side thereof and having a dentate surface on the opposite side thereof, said detate surface defining a grooved guide track and teeth between adjacent groove portions of said grooved guide track, the entirety of said recording medium base, including said teeth, being made of a single light-transparent non-magnetic material;
   a first, vertically anisotropic, magnetic film layer coated directly on said flat surface and being disposed on the opposite side of said base from said detate surface, said magnetic film layer being magnetizable anisotropically in a direction normal to said flat surface of said base,
   the thickness of said base being less at said grooved guide track than at said teeth so that the reflectance of said base is different at said grooved guide track and at said teeth, respectively whereby tracking is performed by detecting said difference in reflectance.

6. A magneto-optical recording medium as claimed in claim 5, wherein the width of each of said groove portions of said grooved guide track is in the range of about 0.3 μm to about 3 μm, and the pitch of said grooved guide track is in the range of about 1.5 μm to about 6 μm.

7. A magneto-optical recording medium as claimed in claim 5, wherein said vertically anisotropic magnetic film layer comprises a rare earth element and a transition element.

8. A magneto-optical recording medium as claimed in claim 5, wherein the thickness of said vertically anisotropic magnetic film layer is in the range of about 0.05 μm to about 0.5 μm.

9. A magneto-optical recording medium as claimed in claim 5, further comprising an intermediate support material formed on said first vertically anisotropic magnetic film layer on the opposite side thereof from said first recording medium base; a second vertically anisotropic magnetic film layer which is substantially the same as said first vertically anisotropic magnetic film layer and is formed on said intermediate support material on the side thereof opposite to said first vertically anisotropic magnetic film layer; and a second recording medium base which is substantially the same as said first recording medium base and is formed on said second vertically anisotropic magnetic film layer on the opposite side thereof from said intermediate support material.

10. A magneto-optical recording medium as claimed in claim 9, further comprising a first protective layer between said first vertically anisotropic magnetic film layer and said intermediate support material; and a second protective layer between said second vertically anisotropic magnetic film layer and said intermediate support material.

11. A magneto-optical recording medium as claimed in claim 5, further comprising a protective layer formed on said vertically anisotropic magnetic film layer on the opposite side thereof from said recording medium base.

12. A magneto-optical recording medium as claimed in claim 11 wherein said protective layer is made of a non-magnetic material.

13. A magneto-optical recording medium as claimed in claim 11, wherein the thickness of said protective layer is in the range of about 0.1 μm to about 0.5 μm.

* * * * *